United States Patent
Zhang et al.

(10) Patent No.: US 11,924,775 B2
(45) Date of Patent: Mar. 5, 2024

(54) POWER CONTROL METHOD AND TERMINAL

(71) Applicant: Huawei Technologies Co., Ltd., Shenzhen (CN)

(72) Inventors: Lili Zhang, Beijing (CN); Guorong Li, Shenzhen (CN); Hongcheng Zhuang, Shenzhen (CN); Richard Stirling-Gallacher, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/556,442

(22) Filed: Dec. 20, 2021

(65) Prior Publication Data
US 2022/0191804 A1    Jun. 16, 2022

Related U.S. Application Data

(63) Continuation of application No. 16/349,429, filed as application No. PCT/CN2017/071015 on Jan. 12, 2017, now Pat. No. 11,246,101.

(30) Foreign Application Priority Data

Nov. 14, 2016    (CN) .......................... 201611000177.7

(51) Int. Cl.
*H04W 52/24*    (2009.01)
*H04W 52/08*    (2009.01)
(Continued)

(52) U.S. Cl.
CPC ......... *H04W 52/242* (2013.01); *H04W 52/08* (2013.01); *H04W 52/16* (2013.01);
(Continued)

(58) Field of Classification Search
CPC ... H04W 52/242; H04W 52/08; H04W 52/16; H04W 52/245; H04W 52/42; H04W 72/046; H04W 52/146; H04W 52/243
See application file for complete search history.

(56) References Cited

U.S. PATENT DOCUMENTS

2007/0010253 A1*   1/2007   Gunnarsson .......... H04W 52/12
                                                              455/442
2010/0227606 A1*   9/2010   Nan ...................... H04L 1/0023
                                                              455/422.1
(Continued)

FOREIGN PATENT DOCUMENTS

CN      101369834 A     2/2009
CN      101577569 A     11/2009
(Continued)

OTHER PUBLICATIONS

"3rd Generation Partnership Project; Technical Specification Group Radio Access Network; Study on New Radio (NR) Access Technology Physical Layer Aspects (Release 14)," 3GPP TR 38.802, V0.3.0, Oct. 2016, 43 pages.
(Continued)

*Primary Examiner* — Lewis G West
(74) *Attorney, Agent, or Firm* — Conley Rose, P.C.

(57) ABSTRACT

A power control method includes obtaining, by a first terminal, parameter information required for power control, where the parameter information includes at least one of a first parameter, a second parameter, and a third parameter, and determining, by the first terminal based on the parameter information, uplink transmit power used when uplink transmission is performed on a target beam or a target beam pair; where the first parameter includes a beam reception gain of a network device and/or a beam sending gain of the first terminal, where the second parameter is used to indicate interference caused by a second terminal to the first terminal (Continued)

A first terminal obtains parameter information required for power control, where the parameter information includes at least one of a first parameter, a second parameter, and a third parameter — 401

The first terminal determines, based on the parameter information, uplink transmit power used when uplink transmission is performed on a target beam (or a target beam pair) — 402 on the target beam, and where the third parameter includes beam-specific target power and/or terminal-specific target power.

21 Claims, 4 Drawing Sheets

(51) Int. Cl.
    *H04W 52/16*     (2009.01)
    *H04W 52/42*     (2009.01)
    *H04W 72/044*     (2023.01)

(52) U.S. Cl.
    CPC ......... *H04W 52/245* (2013.01); *H04W 52/42* (2013.01); *H04W 72/046* (2013.01)

(56) References Cited

U.S. PATENT DOCUMENTS

| | | | |
|---|---|---|---|
| 2011/0075594 A1* | 3/2011 | Burstrom | H04W 52/242 370/280 |
| 2011/0081939 A1 | 4/2011 | Damnjanovic et al. | |
| 2011/0105059 A1 | 5/2011 | Gaal et al. | |
| 2011/0242990 A1* | 10/2011 | Simonsson | H04W 72/542 370/242 |
| 2012/0028676 A1* | 2/2012 | He | H04W 36/0016 455/517 |
| 2012/0176915 A1 | 7/2012 | Lee et al. | |
| 2013/0058293 A1 | 3/2013 | Nishikawa et al. | |
| 2013/0102345 A1* | 4/2013 | Jung | H04B 7/0617 455/513 |
| 2013/0107915 A1* | 5/2013 | Benjebbour | H04B 7/0486 375/295 |
| 2014/0105042 A1 | 4/2014 | Cui et al. | |
| 2014/0126530 A1* | 5/2014 | Siomina | H04W 52/146 370/330 |
| 2014/0153536 A1* | 6/2014 | Ouchi | H04W 52/04 370/329 |
| 2014/0169209 A1* | 6/2014 | Imamura | H04B 17/24 370/252 |
| 2014/0169321 A1* | 6/2014 | Imamura | H04W 52/146 370/329 |
| 2014/0177607 A1 | 6/2014 | Li et al. | |
| 2014/0185481 A1* | 7/2014 | Seol | H04W 52/24 370/252 |
| 2014/0211738 A1* | 7/2014 | Park | H04W 24/10 370/329 |
| 2014/0221038 A1* | 8/2014 | Nakashima | H04L 5/0051 455/522 |
| 2015/0124673 A1* | 5/2015 | Ouchi | H04W 52/58 370/311 |
| 2015/0289280 A1* | 10/2015 | Davydov | H04W 76/14 370/252 |
| 2016/0095008 A1* | 3/2016 | Zhao | H04W 36/0085 370/252 |
| 2016/0198414 A1* | 7/2016 | Yano | H04W 52/242 455/522 |
| 2016/0205633 A1* | 7/2016 | Mizusawa | H04B 7/0456 455/522 |
| 2017/0026962 A1* | 1/2017 | Liu | H04W 74/0833 |
| 2018/0279229 A1* | 9/2018 | Dinan | H04W 74/0833 |
| 2018/0324716 A1* | 11/2018 | Jeon | H04W 74/0833 |
| 2018/0324853 A1* | 11/2018 | Jeon | H04W 52/04 |
| 2021/0022091 A1* | 1/2021 | Li | H04W 52/242 |
| 2021/0067994 A1* | 3/2021 | Chen | H04W 48/12 |
| 2021/0203397 A1* | 7/2021 | Xiong | H04W 72/046 |
| 2023/0147157 A1* | 5/2023 | Ibrahim | H04L 5/0073 370/329 |

FOREIGN PATENT DOCUMENTS

| | | |
|---|---|---|
| CN | 101902750 A | 12/2010 |
| CN | 102415007 A | 4/2012 |
| CN | 102550090 A | 7/2012 |
| CN | 105122662 A | 12/2015 |
| CN | 105122900 A | 12/2015 |
| CN | 105580448 A | 5/2016 |
| JP | 2011223107 A | 11/2011 |
| JP | 2012526466 A | 10/2012 |
| JP | 2013187818 A | 9/2013 |
| JP | 2016506681 A | 3/2016 |
| KR | 20120080327 R | 7/2012 |
| KR | 20140084821 A | 7/2014 |
| WO | 2007008166 A1 | 1/2007 |
| WO | 2010071500 A1 | 6/2010 |
| WO | 2015045659 A1 | 4/2015 |
| WO | 2016003692 A1 | 1/2016 |
| WO | 2016152005 A1 | 9/2016 |

OTHER PUBLICATIONS

Huawei, et al., "UL power control for NR MIMO," R1-1608821,3GPP TSG RAN WG1 Meeting #86bis, Lisbon, Portugal, Oct. 10-14, 2016, 4 pages.

Intel Corporation, "Discussion on UL Power Control" R1-1609531, 3GPP TSG-RAN WG1 #86bis, Lisbon, Portugal, Oct. 10-14, 2016, 5 pages.

Asustek, "UL power control in multi-beam based approaches" R1-1610232, 3GPP TSG RAN WG1 Meeting #86bis, Lisbon, Portugal, Oct. 10-14, 2016, 3 pages.

Nokia, et al., "Power Control for MIMO," R1-1610283, 3GPP TSG-RAN WG1 Meeting #86bis, Lisbon, Portugal, Oct. 10-14, 2016, 5 pages.

"3rd Generation Partnership Project; Technical Specification Group Radio Access Network; Study on New Radio (NR) Access Technology, Physical Layer Aspects (Release 14)," R1-1612707, 3GPP TR 38.802 V0.3.1, Nov. 2016, 54 pages.

R1-1612876, Nokia et al., "Power Control for MIMO," 3GPP TSG-RAN WG1 Meeting #87, Reno, USA, Nov. 14-18, 2016, 4 pages.

R1-1611677, Huawei et al., "Further discussion of UL power control for NR," 3GPP TSG RAN WG1 Meeting #87, Reno, USA, Nov. 14-18, 2016, 3 pages.Aug. 29, 2019.

\* cited by examiner

POWER CONTROL METHOD AND TERMINAL

CROSS-REFERENCE TO RELATED APPLICATIONS

This is a continuation of U.S. patent application Ser. No. 16/349,429 filed on May 13, 2019, which is a National Stage of International Patent Application No. PCT/CN2017/071015 filed on Jan. 12, 2017, which claims priority to Chinese Patent Application No. 201611000177.7 filed on Nov. 14, 2016. All of the aforementioned applications are hereby incorporated by reference in their entireties.

TECHNICAL FIELD

Embodiments relate to the field of communications technologies, and in particular, to a power control method and a terminal.

BACKGROUND

A millimeter wave refers to an electromagnetic wave that has a millimeter-level wavelength, and a carrier frequency of the millimeter wave is approximately between 30 GHz and 300 GHz. Because a higher carrier frequency indicates higher signal bandwidth and a higher data transmission rate that can be implemented, a high frequency band greater than 6 GHz is introduced into a 5G (5th-Generation, fifth generation mobile communications technology) network for communication, in order to use transmission characteristics of high bandwidth and a high rate of the millimeter wave. However, another characteristic of the millimeter wave is that attenuation in the air is relatively high, that is, path loss is relatively high. Therefore, generally, transmission is performed using a beam (beam) to improve transmission distance and transmission integrity.

In an LTE (Long Term Evolution) system, when a terminal performs uplink transmission on a wireless access device, uplink power control (Power Control, PC) needs to be performed first, so as to ensure quality of sending data on an uplink channel, and minimize interference to another terminal in the system. Power control of a PUSCH (Physical Uplink Shared Channel) is used as an example. The terminal estimates, based on the transmit power of the wireless access device and received signal strength of a current terminal, a path loss of current transmission, and then adds the path loss to a preset power control formula to determine transmit power of data transmission on the PUSCH. If the path loss is greater, the determined transmit power is greater.

However, when a wireless network terminal is used as a transmitter to send data using a beam, to adapt to different channel transmission or channel change conditions, beam width may be adjusted, in order to adjust beam sending gain. When the terminal is used as a receiver to receive data using a beam, to adapt to different channel transmission or channel change conditions, beam width may be adjusted, in order to adjust beam reception gain. The beam sending gain and the beam reception gain affect estimation of the path loss by the terminal, which causes path loss deviation. Therefore, corresponding adjustment needs to be made to the transmit power in the transmission process. If the terminal estimates the path loss based on the power control method of the existing LTE system, the obtained estimated path loss deviates from actual path loss, and consequently, the determined transmit power deviates from actually required transmit power.

SUMMARY

Embodiments provide a power control method and a terminal to improve accuracy of transmit power used by the terminal during uplink transmission.

The following technical solutions are used to achieve the foregoing objective.

According to a first aspect, an embodiment provides a power control method, including: obtaining, by a first terminal, parameter information required for power control, where the parameter information includes at least one of a first parameter, a second parameter, and a third parameter; and then determining, by the first terminal based on the parameter information, uplink transmit power used when uplink transmission is performed on a target beam or a target beam pair.

The first parameter includes a beam reception gain of the network device and/or a beam sending gain of the first terminal. In this way, when calculating the uplink transmit power, the first terminal may determine more accurate path loss compensation using the beam reception gain of the network device and/or the beam sending gain of the first terminal to improve accuracy of the uplink transmit power.

The second parameter includes a value of interference caused by a second terminal to the first terminal on the target beam. In this way, when calculating the uplink transmit power, the first terminal may determine more accurate path loss compensation using the foregoing interference value to improve accuracy of the uplink transmit power.

The third parameter includes beam-specific target power and/or terminal-specific target power. In this way, when calculating the uplink transmit power, the first terminal may determine more accurate target power value using the foregoing third parameter to improve accuracy of the uplink transmit power.

According to one aspect, the first parameter further includes a first compensation factor of the beam sending gain of the first terminal and/or a first compensation factor of the beam reception gain of the network device, where the first compensation factor is any value greater than or equal to 0 and less than or equal to 1.

According to another aspect, the second parameter further includes a second compensation factor of the foregoing interference value, where the second compensation factor is any value greater than or equal to 0 and less than or equal to 1; and the interference value is used to indicate interference that is detected by the network device on the target beam that is caused by uplink transmission of the second terminal to uplink transmission of the first terminal.

According to another aspect, the method further includes: obtaining, by the first terminal, a fourth parameter, where the fourth parameter includes a beam sending gain of the network device and/or a beam reception gain of the first terminal, so that the first terminal may first determine a path loss of the target beam or the target beam pair based on the fourth parameter, and then the first terminal determines the uplink transmit power based on the path loss and the foregoing parameter information using a preset power control formula.

According to another aspect, making a determination of a path loss of the target beam or the target beam pair based on the fourth parameter includes determining, by the first terminal, the path loss of the target beam or the target beam pair based on at least one of the transmit power of the network device, the beam sending gain of the network device, received signal strength of the first terminal, and the beam reception gain of the first terminal.

According to another aspect, after the determining, by the first terminal, a path loss of the target beam or the target beam pair based on the fourth parameter, the method further includes correcting, by the first terminal, the path loss using the first parameter, where the corrected path loss is a difference between the path loss and the first parameter before the correction.

According to another aspect, the foregoing uplink transmission refers to at least one of, transmission on a PUSCH, transmission on a PUCCH (Physical Uplink Control Channel), transmission on a PRACH (Physical Random Access Channel), and transmission of an SRS (Sounding Reference Signal), According to another aspect, the first parameter may be determined based on at least one of a service type of to-be-transmitted data, an uplink channel type, a width of the target beam, a number of a subframe, a number of the target beam, a number of the target beam pair, a number of a carrier, and a number of a subcarrier.

According to another aspect, the parameter information further includes a fifth parameter, and the fifth parameter is used to indicate an adjustment value of closed-loop power control for performing uplink transmission on the target beam or the target beam pair; where the fifth parameter is a sum of an adjustment value and an offset that are used when power control is performed in a target subframe, and the target subframe is a subframe that is of a same type as a current subframe and that is followed by the current subframe.

According to another aspect, the obtaining, by a first terminal, parameter information required for power control includes obtaining the parameter information using at least one of RRC (Radio Resource Control) signaling, MAC (Media Access Control) signaling, and physical layer signaling.

According to another aspect, the parameter information includes the first parameter, and the obtaining parameter information required for power control includes obtaining, by the first terminal, the first parameter using TPC (Transmit Power Control) signaling in a PDCCH, or obtaining, the first parameter by using signaling used for closed-loop power control.

According to another aspect, the parameter information includes the third parameter, and obtaining parameter information required for power control includes obtaining, using the physical layer signaling, the third parameter sent by the network device, where the third parameter carries the first parameter.

According to another aspect, the parameter information further includes configuration information of target RSRP (Reference Signal Received Power), and the configuration information of the target RSRP includes duration of the target beam, a quantity of samples of the target beam, or information about instantaneous RSRP.

According to another aspect, the configuration information of the target RSRP is carried in the RRC signaling or the MAC signaling.

According to another aspect, the method further includes activating, by the first terminal based on physical layer signaling sent by the network device, the target RSRP indicated by the configuration information of the target RSRP.

According to another aspect, an embodiment provides a terminal, where the terminal is a first terminal, and the first terminal includes: an obtaining unit, configured to obtain parameter information required for power control, where the parameter information includes at least one of a first parameter, a second parameter, or a third parameter; and a determining unit, configured to determine, based on the parameter information, uplink transmit power used when uplink transmission is performed on a target beam or a target beam pair; where the first parameter includes a beam reception gain of a network device and/or a beam sending gain of the first terminal; the second parameter includes a value of interference caused by a second terminal to the first terminal on the target beam, and the second terminal includes one or more terminals other than the first terminal; and the third parameter includes beam-specific target power and/or terminal-specific target power. The beam-specific target power is a target power value set by the network device for the target beam or the target beam pair, and the terminal-specific target power is a target power value that is set by the network device for the first terminal on the target beam or the target beam pair.

According to one aspect, the first parameter further includes a first compensation factor of the beam sending gain of the first terminal and/or a first compensation factor of the beam reception gain of the network device, where the first compensation factor is any value greater than or equal to 0 and less than or equal to 1.

According to another aspect, the second parameter further includes a second compensation factor of the interference value, where the second compensation factor is any value greater than or equal to 0 and less than or equal to 1; and the interference value is used to indicate interference that is detected by the network device on the target beam and that is caused by uplink transmission of the second terminal to uplink transmission of the first terminal.

According to another aspect, the obtaining unit is further configured to obtain a fourth parameter, where the fourth parameter includes a beam sending gain of the network device and/or a beam reception gain of the first terminal, and the determining unit is configured to determine a path loss of the target beam or the target beam pair based on the fourth parameter, and determine the uplink transmit power based on the path loss and the parameter information using a preset power control formula.

According to another aspect, the determining unit is configured to determine the path loss of the target beam or the target beam pair based on at least one of: transmit power of the network device; the beam sending gain of the network device in the fourth parameter; received signal strength of the first terminal; and the beam reception gain of the first terminal in the fourth parameter.

According to another aspect, the determining unit is further configured to correct the path loss using the first parameter, where the corrected path loss is a difference between the path loss and the first parameter before the correction.

According to another aspect, the first parameter is determined based on at least one of a service type of to-be-transmitted data, an uplink channel type, a width of the target beam, a number of a subframe, a number of the target beam, a number of the target beam pair, a number of a carrier, and a number of a subcarrier.

According to another aspect, the parameter information further includes a fifth parameter, and the fifth parameter is used to indicate an adjustment value of closed-loop power control for performing uplink transmission on the target beam or the target beam pair; where the fifth parameter is a sum of an adjustment value and an offset that are used when power control is performed in a target subframe, and the target subframe is a subframe that is of a same type as a current subframe and that is followed by the current subframe.

According to another aspect, the obtaining unit is configured to obtain the parameter information using at least one of RRC signaling, MAC signaling, and physical layer signaling.

According to another aspect, the obtaining unit is configured to: obtain the first parameter using TPC signaling in a PDCCH; or obtain the first parameter using signaling used for closed-loop power control.

According to another aspect, the obtaining unit is configured to obtain, using the physical layer signaling, the third parameter sent by the network device, where the third parameter carries the first parameter.

According to another aspect, the parameter information further includes configuration information of a target RSRP, and the configuration information of the target RSRP includes duration of the target beam, a quantity of samples of the target beam, or information about an instantaneous RSRP, and the determining unit is further configured to activate, based on the physical layer signaling sent by the network device, the target RSRP indicated by the configuration information of the target RSRP.

According to another aspect, an embodiment provides a terminal, where the terminal is a first terminal that includes a processor, a memory, a bus, and a communications interface. The processor is configured to obtain parameter information required for power control through the communications interface, where the parameter information includes at least one of a first parameter, a second parameter, or a third parameter. The processor is further configured to determine, based on the parameter information, uplink transmit power used when uplink transmission is performed on a target beam or a target beam pair, where the first parameter includes a beam reception gain of a network device and/or a beam sending gain of the first terminal, the second parameter includes a value of interference caused by a second terminal to the first terminal on the target beam, and the second terminal includes one or more terminals other than the first terminal, and the third parameter includes beam-specific target power and/or terminal-specific target power. The beam-specific target power is a target power value set by the network device for the target beam or the target beam pair, and the terminal-specific target power is a target power value that is set by the network device for the first terminal on the target beam or the target beam pair.

According to another aspect, the processor is further configured to obtain a fourth parameter through the communications interface, where the fourth parameter includes a beam sending gain of the network device and/or a beam reception gain of the first terminal, and the processor is configured to determine a path loss of the target beam or the target beam pair based on the fourth parameter and determine the uplink transmit power based on the path loss and the parameter information using a preset power control formula.

According to another aspect, the processor is configured to determine the path loss of the target beam or the target beam pair based on at least one of, transmit power of the network device, the beam sending gain of the network device in the fourth parameter, received signal strength of the first terminal, and the beam reception gain of the first terminal in the fourth parameter.

According to another aspect, the processor is further configured to correct the path loss using the first parameter, where the corrected path loss is a difference between the path loss and the first parameter before the correction.

According to another aspect, the processor is configured to obtain the parameter information by invoking the communications interface and using at least one of RRC signaling, MAC signaling, and physical layer signaling.

According to another aspect, the processor is configured to: obtain the first parameter by invoking the communications interface and using TPC signaling in a PDCCH; or obtain the first parameter using signaling used for closed-loop power control.

According to another aspect, the processor is configured to obtain, by invoking the communications interface and using the physical layer signaling, the third parameter sent by the network device, where the third parameter carries the first parameter.

According to another aspect, the parameter information further includes configuration information of a target reference signal received power RSRP, and the configuration information of the target RSRP includes duration of the target beam, a quantity of samples of the target beam, or information about an instantaneous RSRP The processor is further configured to activate, based on the physical layer signaling sent by the network device, the target RSRP indicated by the configuration information of the target RSRP.

According to another aspect, an embodiment provides a computer storage medium configured to store a computer software instruction implemented by the foregoing first terminal, where the computer storage instruction includes a program designed to execute the foregoing aspect.

According to another aspect, an embodiment provides a computer program. The computer program includes an instruction whereby a computer executes the computer program, and performs any one of the power control methods in the foregoing first aspect.

In the embodiments disclosed, names of the first terminal, the second terminal and the network device impose no limitation on devices or function modules. In actual implementation, these devices or function modules may be represented by other names. All devices or function modules with functions similar to those in the disclosure fall within the scope defined by the claims and equivalent technologies.

In addition, for a technical effect brought by any design implementation in the disclosed aspects, refer to technical effects brought by different design manners in the first aspect. Details are not described herein again.

These and other aspects of the disclosure are further illustrated and comprehensible in descriptions of the following embodiments.

DESCRIPTION OF EMBODIMENTS

The following describes the technical solutions in detail with reference to the accompanying drawings in the disclosed exemplary embodiments.

In addition, the terms "first" and "second" are merely intended for a purpose of description, and shall not be understood as an indication or implication of relative importance or implicit indication of the number of indicated technical features. Therefore, a feature limited by "first" or "second" may explicitly or implicitly include one or more features. In the description, "a plurality of" means two or at least two unless otherwise stated.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
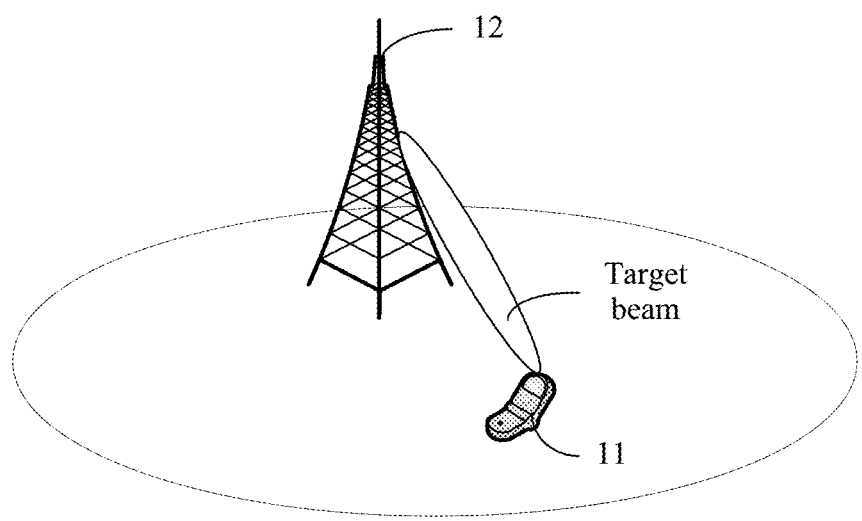
FIG. 1 is a schematic structural diagram of a power control system according to an embodiment.

An embodiment provides a power control method, and the method may be applied to a power control system shown in FIG. 1. The system includes at least one terminal 11 and a network device 12. Wireless transmission may be performed between the terminal 11 and the network device 12 using a beam, for example, a target beam shown in FIG. 1.

The terminal 11 may be UE (user equipment, user equipment) in a 5G network, or may be any UE in LTE or another network. For example, the terminal 11 may be a mobile phone, a tablet, a notebook computer, a UMPC (ultra-mobile personal computer, ultra-mobile personal computer), a netbook, a PDA (personal digital assistant, personal digital assistant), or the like. This is not limited in this embodiment.

The network device 12 may be any base station, a new radio eNB (new radio eNB), a transmission and reception point (transmission and reception point, TRP), a macro base station, a micro base station, a high frequency base station, or the like in the 5G network. This is not limited in this embodiment.

In an LTE system, when the terminal performs uplink transmission on the network device, uplink transmit power may be calculated using a preset power control formula. For example, when the uplink transmission is performed on a PUSCH of a subframe i (i≥0), the terminal may calculate, using the following formula (1), uplink transmit power that needs to be used when uplink transmission is performed on the subframe i.

$$P_{PUSCH,c}(i) = \min\begin{Bmatrix} P_{CMAX,c}(i), \\ 10\log_{10}(M_{PUSCH,c}(i)) + P_{O\text{-}PUSCH,c}(j) + \\ \alpha_c(j) \cdot PL_c + \Delta_{TF,c}(i) + f_c(i) \end{Bmatrix} \quad (1)$$

$P_{CMAX,c}(i)$ is a maximum transmit power of the terminal;

$M_{PUSCH,c}(i)$ is a quantity of RBs (resource block, resource block) used for performing PUSCH transmission in a subframe i;

$P_{O\text{-}PUSCH,c}(j)$ is a target power value that is semi-statically set by the network device. The target power value is generally related to cell-specific target power and terminal-specific target power specified in the 3GPP protocol. A value of a parameter j is related to an uplink transmitted data packet. When a semi-persistent grant data packet is transmitted, j=0; when a dynamically scheduled grant data packet is transmitted, j=1; or when a random access response grant data packet is transmitted, j=2;

$PL_c$ is a path loss estimated when the terminal performs the uplink transmission, $\alpha_c$ is a compensation factor of the path loss, and $0 \leq \alpha_c \leq 1$;

$\Delta_{TF,c}(i)$ is an MCS-based power adjustment value; and $f_c(i)$ is an adjustment value used when power control is performed in the subframe i.

The terminal may calculate, using the foregoing parameters, the uplink transmit power $P_{PUSCH,c}(i)$ for performing the uplink transmission on the subframe i.

A millimeter wave with a higher carrier frequency is introduced to the 5G network for communication, so as to use transmission characteristics of high bandwidth and a high rate of the millimeter wave. However, to overcome a disadvantage that millimeter wave attenuation is relatively high in the air, the terminal and/or the network device may perform the uplink transmission by adjusting a width of the beam and using the beam as a transmission medium. The width of the beam is generally less than a width of a beam in a conventional LTE system.

When the terminal uses the foregoing beam to transmit uplink data, there is a specific beam sending gain. In addition, when the base station uses the beam to receive the uplink data, there is a specific beam reception gain. The beam sending gain and the beam reception gain may reduce path loss compensation that is actually required in a transmission process, and in this case, if the uplink transmit power is still calculated using the foregoing formula (1), the path loss compensation determined by the terminal is greater than an actual requirement. Therefore, the calculated uplink transmit power is relatively high, which not only increases power consumption of the terminal, but also increases interference to another terminal in the system.

Therefore, an embodiment provides a power control method. A first terminal is used as an example. When determining uplink transmit power, the first terminal may first obtain parameter information required for power control, and then determine, based on the parameter information, uplink transmit power used when uplink transmission is performed on a target beam (or a target beam pair). The target beam is a beam used when the first terminal subsequently performs the uplink transmission, and the target beam pair is a beam used when the first terminal subsequently performs the uplink transmission or a beam used when the network device receives data in the uplink transmission process.

The parameter information includes at least one of the following parameters: a first parameter, a second parameter, and a third parameter.

The foregoing first parameter includes a beam reception gain of the network device and/or a beam sending gain of the first terminal. In this way, when calculating the uplink transmit power, the first terminal may determine more accurate path loss compensation using the beam reception gain of the network device and/or the beam sending gain of the first terminal, so as to improve accuracy of the uplink transmit power.

The second parameter includes a value of interference that is caused by the second terminal (the second terminal includes one or more terminals other than the first terminal) to the first terminal on the target beam. In this way, when calculating the uplink transmit power, the first terminal may determine more accurate path loss compensation using the foregoing interference value, so as to improve accuracy of the uplink transmit power.

The third parameter includes beam-specific target power and/or terminal-specific target power, where the beam-specific target power is a target power value set by the network device for the target beam (or the target beam pair), and the terminal-specific target power is a target power value (the foregoing target power value may be referred to as nominal power) set by the network device for the first terminal on the target beam (or the target beam pair). Because the beam-specific target power is not considered in $P_{O\text{-}PUSCH,c}$ in the formula (1) in the prior art, in this embodiment, when calculating the uplink transmit power, the first terminal may determine more accurate $P_{O\text{-}PUSCH,c}$, that is $P_{O\text{-}PUSCH,c}'$, using the foregoing third parameter, thereby improving accuracy of uplink transmit power. $P_{O\text{-}PUSCH,c}'$ may be at least one of or a sum of two or more of the cell-specific target power, the beam-specific target power, and the terminal-specific target power.

For example, the first terminal may obtain one or more parameters in the foregoing parameter information from the network device using at least one of RRC (Radio Resource Control) signaling, MAC (Media Access Control, Media Access Control) signaling, and physical layer signaling. This is not limited in this embodiment.

It may be understood that, after obtaining the one or more parameters in the foregoing parameter information, the first terminal may still use the method in the prior art to obtain another parameter required for determining the uplink transmit power, for example, $M_{PUSCH,c}(i)$, $P_{CMAX,c}(i)$, or the like in the formula (1). This is not limited in this embodiment.

In addition, in the foregoing embodiment, transmission on the PUSCH is only used as an example for description. It should be understood that the foregoing power control method may be further applied to transmission on a PUCCH (Physical Uplink Control Channel), transmission on a PRACH (Physical Random Access Channel), transmission of an SRS (Sounding Reference Signal), and the like. In subsequent embodiments, details are described with reference to specific embodiments. Therefore, details are not described herein.

Figure 2:
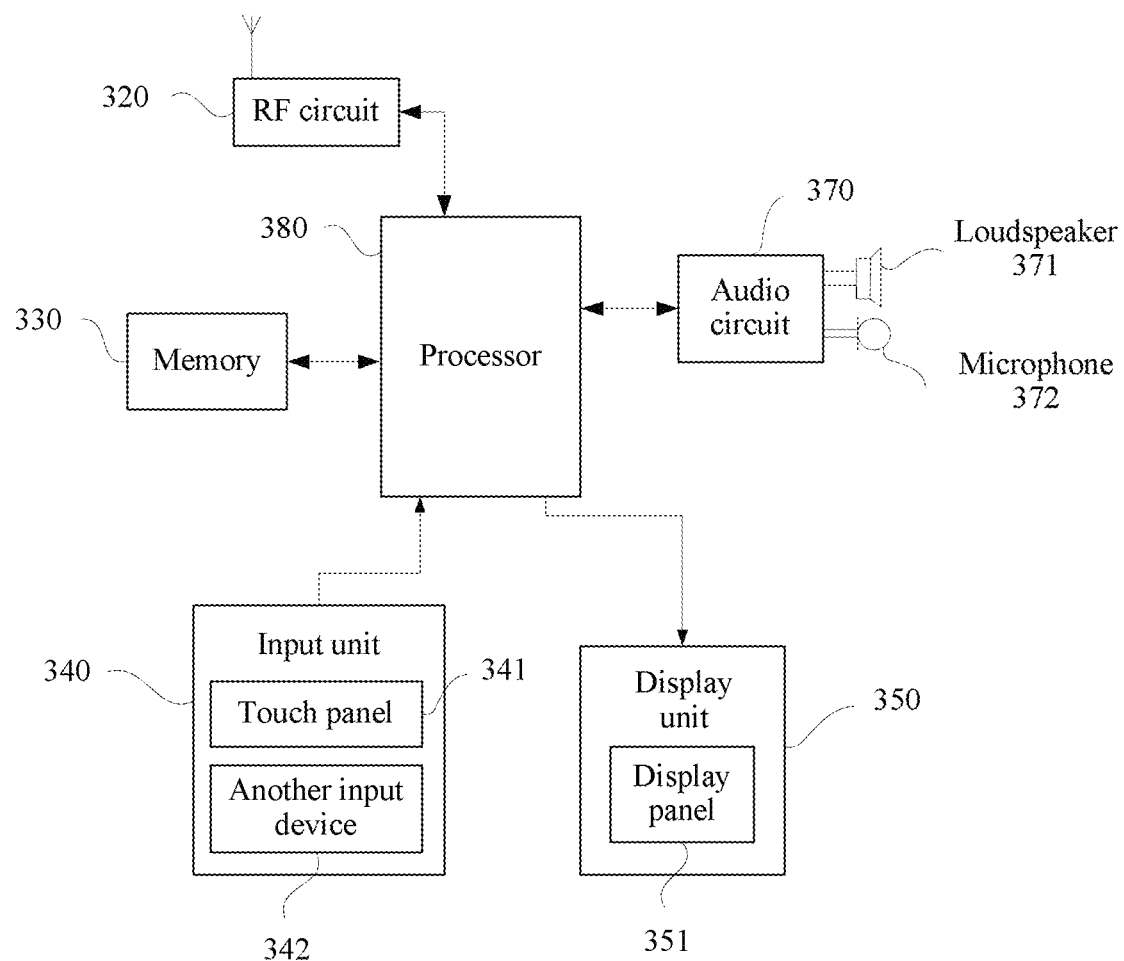
FIG. 2 is schematic structural diagram 1 of a terminal according to an embodiment.

For a hardware structure of a terminal 11 (for example, the foregoing first terminal) in this embodiment, refer to components of the terminal 11 shown in FIG. 2.

As shown in FIG. 2, the terminal 11 may include components such as an RF (radio frequency, radio frequency) circuit 320, a memory 330, an input unit 340, a display unit 350, a gravity sensor 360, an audio circuit 370, a processor 380, and a power supply 390. A person skilled in the art may understand that a structure of the terminal shown in FIG. 5 does not constitute a limitation on the terminal 11, may include more or fewer components than those shown in FIG. 6, combine some components, or have different component deployment.

The following describes each component of the terminal 11 in detail with reference to FIG. 2.

The RF circuit 320 may be configured to receive or send a signal in an information receiving or sending process or a call process. In particular, after receiving downlink information of a network device 12, the RF circuit 320 sends the downlink information to the processor 380 for processing, and sends uplink data to the network device 12. Generally, the RF circuit includes but is not limited to an antenna, at least one amplifier, a transceiver, a coupler, an LNA (low noise amplifier, low noise amplifier), a duplexer, and the like. In addition, the RF circuit 320 may further communicate with a network and another device through wireless communication.

The memory 330 may be configured to store a software program and a module, and the processor 380 performs various function applications of the terminal 11 and processes data by running the software program and the module that are stored in the memory 330.

The input unit 340 may be configured to: receive input digital or character information, and generate key signal input related to user setting and function control of the terminal 11. The input unit 340 may include a touch panel 341 and another input device 342.

The display unit 350 may be configured to display information input by the user or information provided for the user, and various menus of the terminal 11. The display unit 350 may include a display panel 351. Optionally, the display panel 351 may be configured using an LCD (Liquid Crystal Display, liquid crystal display), an OLED (Organic Light-Emitting Diode, organic light-emitting diode), or the like.

The terminal 11 may further include the gravity sensor (gravity sensor) 360 and another sensor, for example, an optical sensor, a gyroscope, a barometer, a hygrometer, a thermometer, and an infrared sensor. Details are not described herein.

The audio circuit 370, a loudspeaker 371, and a microphone 372 may provide an audio interface between the user and the terminal 11. The audio circuit 370 may transmit, to the loudspeaker 371, a received electrical signal obtained after audio data conversion, and the loudspeaker 371 converts the electrical signal to a sound signal for output. In addition, the microphone 372 converts a collected sound signal to an electrical signal, and the audio circuit 370 receives the electrical signal, converts the electrical signal to audio data, and outputs the audio data to the RF circuit 320, to send the audio data to, for example, another terminal device, or outputs the audio data to the memory 330 for further processing.

The processor 380 is a control center of the terminal 11, and connects to various parts of the terminal 11 using various interfaces and lines. The processor 380 performs various functions of the terminal 11 and processes data by running or executing the software program and/or the module stored in the memory 330 and by invoking data stored in the memory 330, so as to perform overall monitoring on the terminal 11. Optionally, the processor 380 may include one or more processing units.

Although not shown in the figure, the terminal 11 may further include a power supply, a Wi-Fi (Wireless Fidelity, Wireless Fidelity) module, a Bluetooth module, and the like. Details are not described herein.

Figure 3:
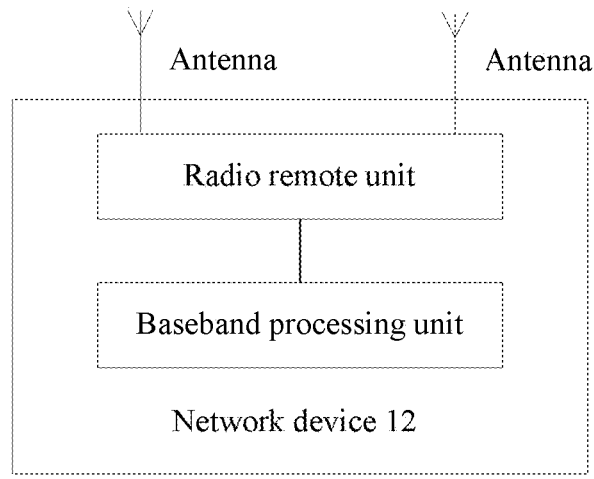
FIG. 3 is a schematic structural diagram of a network device according to an embodiment.

For a hardware structure of the network device 12 in this embodiment, refer to components of the network device 12 shown in FIG. 3. As shown in FIG. 3, the network device 12 includes a BBU (English: Base Band Unit, baseband processing unit), an RRU (English: Radio Remote Unit, radio remote unit), and an antenna. The BBU and the RRU may be connected using an optical fiber, and the RRU is further connected to the antenna using a coaxial cable and a power splitter (coupler). Generally, one BBU may be connected to a plurality of RRUs.

The RRU may include four modules: a digital intermediate frequency module, a transceiver module, a power amplification module, and a filtering module. The digital intermediate frequency module is configured to perform modulation and demodulation of optical transmission, digital up- and down-frequency conversion, digital-to-analog conversion, and the like. The transceiver module completes conversion from an intermediate frequency signal to a radio frequency signal. After being amplified by the power amplification module and filtered by the filtering module, the radio frequency signal is transmitted using the antenna.

The BBU is configured to complete a baseband processing function (encoding, multiplexing, modulation, spread spectrum, and the like) of a Uu interface (that is, an interface between the terminal 11 and the network device 12), an interface function of a logical interface between an RNC (English: Radio Network Controller, radio network controller) and the network device 12, a signaling processing function, local and remote operation and maintenance functions, and working status monitoring and alarm information reporting functions of a network device 12 system.

Figure 4:
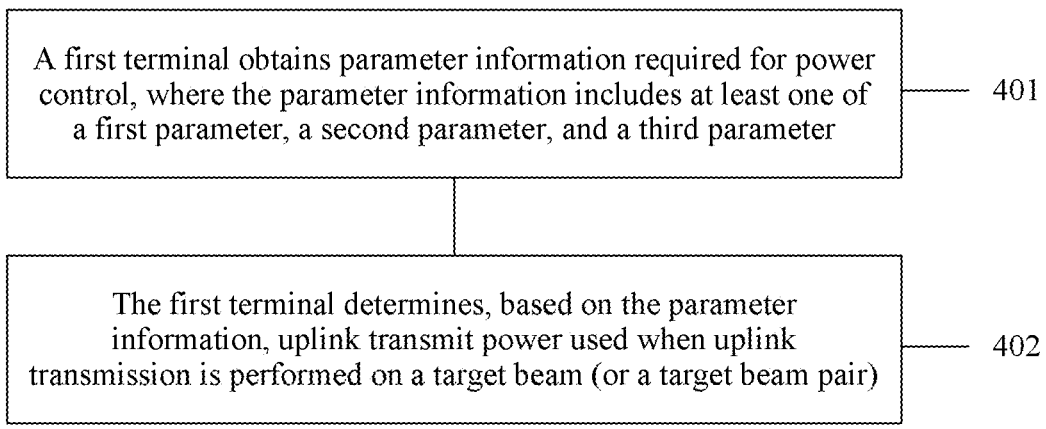
FIG. 4 is a schematic flowchart of a power control method according to an embodiment.

The following describes a power control method according to an embodiment in detail with reference to in FIG. 4.

401. A first terminal obtains parameter information required for power control, where the parameter information includes at least one of a first parameter, a second parameter, and a third parameter.

402. The first terminal determines, based on the parameter information, uplink transmit power used when uplink transmission is performed on a target beam (or a target beam pair).

In a possible implementation, the foregoing parameter information includes the first parameter, and the first parameter includes a beam reception gain of a network device and/or a beam sending gain of the first terminal.

When the network device uses the target beam to receive uplink data and the first terminal uses an omnidirectional beam to send the uplink data, the foregoing first parameter may include a beam reception gain $G_R$ of the network device; when the network device uses the target beam to receive uplink data and the first terminal also uses the target beam to send the uplink data, the foregoing first parameter may include the beam reception gain $G_R$ of the network device and a beam sending gain $G_T$ of the first terminal.

The beam sending gain $G_T$ of the first terminal may be determined by the first terminal itself, or may be obtained by the first terminal from the network device. The beam reception gain $G_R$ of the network device may be obtained by the first terminal from the network device.

In this case, for a subframe i, uplink transmit power for performing uplink transmission on a PUSCH may be the following formula (2):

$$P_{PUSCH,c}(i) = \min\begin{Bmatrix} P_{CMAX,c}(i), \\ 10\log_{10}(M_{PUSCH,c}(i)) + P_{O\text{-}PUSCH,c}(j) + \\ \alpha_c(j) \cdot PL_c - G + \Delta_{TF,c}(i) + f_c(i) \end{Bmatrix} \quad (2)$$

$G=G_R$, or $G_T$, or $G_T+G_R$; other parameters in the formula (2), for example, $M_{PUSCH,c}(i)$, $M_{PUSCH,c}(i)$ $P_{O\text{-}PUSCH,c}(j)$, $\Delta_{TF,c}(i)$ and $f_c(i)$, may be determined using a related method in the prior art.

In the foregoing formula (2), $\alpha_c(j) \cdot PL_c - G$ may be used for new path loss compensation; that is, when a path loss is calculated using the formula (2), the beam reception gain $G_R$ of the network device and/or the beam sending gain $G_T$ of the first terminal are/is considered, so that impact caused by the first parameter G on the uplink transmit power is excluded in the path loss compensation, so as to improve accuracy of the uplink transmit power.

Further, the first parameter may include a first compensation factor of the beam sending gain of the first terminal and/or a first compensation factor of the beam reception gain of the network device, where the first compensation factor may be represented by β, and 0≤β≤1; that is, the first compensation factor β is any value in [0, 1] (which includes 0 and 1), and in this case, the first parameter includes G and β.

In this case, for the subframe i, the uplink transmit power for performing the uplink transmission on the PUSCH may be the following formula (3):

$$P_{PUSCH,c}(i) = \min\begin{Bmatrix} P_{CMAX,c}(i), \\ 10\log_{10}(M_{PUSCH,c}(i)) + P_{O\text{-}PUSCH,c}(j) + \\ \alpha_c(j) \cdot PL_c - \beta + G + \Delta_{TF,c}(i) + f_c(i) \end{Bmatrix} \quad (3)$$

$\beta \cdot G = \beta \cdot G_T$, or $v \cdot G = \beta \cdot G_R$, or $\beta \cdot G = \beta \cdot (G_T + G_R)$.

In addition, different first compensation factors may be set for the beam reception gain $G_R$ of the network device and the beam sending gain $G_T$ of the first terminal; for example, the first compensation factor of the beam reception gain $G_R$ of the network device is $\beta_1$, and the first compensation factor of the beam sending gain $G_T$ of the first terminal is $\beta_2$. In this case, the foregoing formula (3) may be deformed into the following formula (4), that is:

$$P_{PUSCH,c}(i) = \min\begin{Bmatrix} P_{CMAX,c}(i), \\ 10\log_{10}(M_{PUSCH,c}(i)) + P_{O\text{-}PUSCH,c}(j) + \\ \alpha_c(j) \cdot PL_c - (\beta_1 \cdot G_R + \beta_2 \cdot G_T) + \Delta_{TF,c}(i) + f_c(i) \end{Bmatrix} \quad (4)$$

It should be noted that, in the foregoing embodiment, the transmission on the PUSCH is only used as an example for description. The power control method provided in this embodiment may be further applied to transmission on a PUCCH, transmission on a PRACH, transmission of an SRS, and the like. This is not limited in this embodiment.

For example, uplink transmit power of the transmission on the PUCCH may be the following formula (5):

$$P_{PUCCH,c}(i) = \min\begin{Bmatrix} P_{CMAX,c}(i), \\ P_{0\text{-}PUCCH} + PL_c + h(n_{CQI}, n_{HARQ}n_{SR}) - \\ \beta \cdot G + \Delta_{F\text{-}PUCCH}(F) + \Delta_{TxD}(F') + g(i) \end{Bmatrix} \quad (5)$$

Similar to the power control formula of the PUSCH, for example, the foregoing formula (3), $P_{CMAX,c}(i)$ is a maximum transmit power of the first terminal, and $P_{0\text{-}PUCCH}$ is a target power value that is semi-statically set by the network device. $h(n_{CQI}, n_{HARQ}, n_{SR})$ is a value that depends on a PUCCH structure, where $n_{CQI}$ represents a quantity of information bits of a CQI, and $n_{HARQ}$ represents a quantity of bits of a HARQ; $PL_c$ is a path loss estimated when the first terminal performs the uplink transmission; and $g(i)$ is an adjustment value used when power control is performed in the subframe i.

β and G are the foregoing first parameters in the formula (5), where G is the beam reception gain $G_R$ of the network device and/or the beam sending gain $G_T$ of the first terminal, and β is the first compensation factors/the first compensation factor of the beam sending gain of the first terminal and/or the beam reception gain of the network device.

For example, uplink transmit power of the transmission of the SRS may be the following formula (6):

$$P_{SRS,c}(i) = \min \begin{Bmatrix} P_{CMAX,c}(i), \\ P_{SRS-OFFSET,c}(m) + 10\log_{10}(M_{SRS,c}) + \\ P_{O-PUSCH,c}(j) + \alpha_c(j) \cdot PL_c - \beta \cdot G + f_c(i) \end{Bmatrix} \quad (6)$$

$P_{CMAX,c}(i)$ is the maximum transmit power of the first terminal; $P_{SRS-OFFSET,c}(m)$ is a power offset of the SRS relative to the data of PUSCH; $M_{SRS,c}$ is transmission bandwidth of the SRS; $f_c(i)$ is the adjustment value used when the power control is performed in the subframe i; and $P_{O-PUSCH,c}(j)$ is similar to $P_{O-PUSCH,c}(j)$ in formulas (1) to (4).

Similarly, β and G in the formula (6) are the foregoing first parameters, where G is the beam reception gain $G_R$ of the network device and/or the beam sending gain $G_T$ of the first terminal, and β is the first compensation factors/the first compensation factor of the beam sending gain of the first terminal and/or the beam reception gain of the network device.

For ease of description, in subsequent embodiments, the transmission on the PUSCH is used as an example for description.

Further, a specific value of β or G in the foregoing first parameter may be determined by the first terminal based on at least one of a service type of to-be-transmitted data, an uplink channel type, a width of the target beam, a number of a subframe, a number of the target beam, a number of the target beam pair, a number of a carrier, and a number of a subcarrier.

That is, the specific value of β or G may be specific to the service type of the to-be-transmitted data, and/or specific to the uplink channel type, and/or specific to the width of the target beam, and/or specific to the target beam, and/or specific to the subframe, and/or specific to the target beam pair, and/or specific to the carrier, and/or specific to the subcarrier. For example, the service type may include an eMBB (Enhanced Mobile Broadband) service, an mMTC (Massive Machine Type Communication) service, and a URLLC (ultra-reliable and low latency communications) service.

The number of a subframe is used as an example. When the number of the subframe is an odd number, β may be set to 1; or when the number of the subframe is an even number, β may be set to 0. In this case, it may be considered that the subframe is divided into two types: an even number type and an odd number type. Certainly, a person skilled in the art may divide the subframe into different types according to actual experience or an algorithm. This is not limited in this embodiment.

Further, the first terminal may obtain a fourth parameter, where the fourth parameter includes a beam sending gain $A_T$ of the network device and/or a beam reception gain $A_R$ of the first terminal. In particular, when calculating the uplink transmit power using any one of the formula (2) to the formula (6), the first terminal may further obtain the fourth parameter. The first terminal may obtain the fourth parameter while obtaining any parameter in the foregoing parameter information, or may separately obtain the fourth parameter. This is not limited in this embodiment.

The beam reception gain $A_R$ of the first terminal may be determined by the first terminal itself, or may be obtained by the first terminal from the network device. The beam sending gain $A_T$ of the network device may be obtained by the first terminal from the network device.

The first terminal may obtain the foregoing fourth parameter from the network device using at least one of RRC (radio resource control, radio resource control) signaling, MAC (Media Access Control, Media Access Control) signaling, and physical layer signaling. This is not limited in this embodiment.

After obtaining the fourth parameter, the terminal may first determine a path loss of the target beam based on the fourth parameter, that is, $PL_c$ in the foregoing formula (2) to formula (6).

$PL_c$ = transmit power of the network device + the beam sending gain $A_T$ of the network device − received signal strength of the first terminal + the beam reception gain $A_R$ of the first terminal. The calculation formula of $PL_c$ is further applicable to formulas (7) to (9) in subsequent embodiments.

In the foregoing calculation formula of $PL_c$, a value of the received signal strength of the first terminal may be any reference signal received value such as RSRP (reference signal received power, reference signal received power), RSRQ (reference signal received quality, reference signal received quality), or RSSI (received signal strength indication, received signal strength indication).

The received signal strength of the first terminal may be determined based on detection of a first target reference signal, where the first target reference signal is a terminal-specific reference signal (reference signal, RS), for example, an aperiodic reference signal. The first target reference signal may be triggered by the terminal or triggered by a network device. Alternatively, the received signal strength of the first terminal may be determined based on detection of a second target reference signal. The second target reference signal is a cell-specific reference signal, for example, a DRS (discovery RS, discovery signal), an SS (synchronization signal, synchronization signal), or a non-UE-specific DL RS (non-UE-specific downlink reference signal). The second target reference signal may be specific to a sector beam or specific to a wide beam.

It may be understood that, in the foregoing calculation of $PL_c$, configuration signaling delivered by the network device may indicate a specific type of target reference signal (for example, the first target reference signal or the second target reference signal) on which calculation or filtering performed by the received signal strength of the first terminal is based.

Further, the foregoing path loss $PL_c$ may be corrected, for example, a difference between the foregoing path loss $PL_c$ and the first parameter G may be used as a corrected path loss. In this case, the foregoing formula (3) may be deformed into the following formula (7), that is:

$$P_{PUSCH,c}(i) = \min \begin{Bmatrix} P_{CMAX,c}(i), \\ 10\log_{10}(M_{PUSCH,c}(i)) + P_{O-PUSCH,c}(j) + \\ \alpha_c(j) + \Delta_{TF,c}(i) + f_c(i) \end{Bmatrix} \quad (7)$$

In this case, the first compensation factor $\beta = \alpha_c(j)$, and the corrected path loss is $PL_c - G$.

In this case, the network device may directly send a related parameter of the corrected path loss to the first terminal, that is, implicitly send the first parameter to the first terminal.

For example, the network device may send at least one of the following:

the transmit power of the network device + the beam sending gain $A_T$ of the network device;

the transmit power of the network device+the beam sending gain $A_T$ of the network device+the beam reception gain $A_R$ of the first terminal;

the transmit power of the network device+the beam sending gain $A_T$ of the network device+the beam reception gain $A_R$ of the first terminal–the beam sending gain $G_T$ of the first terminal–the beam reception gain $G_R$ of the network device; and the transmit power of the network device+the beam sending gain $A_T$ of the network device–the beam reception gain $G_R$ of the network device.

In addition, because $PL_c-G=$(the transmit power of the network device+the beam sending gain $A_T$ of the network device–the received signal strength of the first terminal+the beam reception gain of the first terminal)–(the beam sending gain $G_T$ of the first terminal+the beam reception gain $G_R$ of the network device), if the beam sending gain $A_T$ of the network device is equal to the beam reception gain $G_R$ of the network device, the network device does not need to send $A_T$ and $G_R$ to the first terminal.

Further, to obtain the foregoing corrected path loss $PL_c-G$, the calculation of target RSRP needs to be supported. Then, the first terminal may further obtain configuration information of the target RSRP from the network device, where the configuration information may be duration of the target beam, a quantity of samples of the target beam, or a filtering type of the target beam. The duration is generally less than duration of an existing RSRP (for example, less than 10 ms), or the quantity of samples is generally less than a quantity of samples of an existing RSRP (for example, fewer than 10 samples). Alternatively, the configuration information may be information about instantaneous RSRP, where the filtering type may be any one of layer-1 filtering, layer-2 filtering, layer-3 filtering. The RSRP may be any reference signal received value such as the RSRQ or the RSSI. This is not limited in this embodiment.

For example, the network device may add the configuration information of the target RSRP to the RRC signaling or the MAC signaling and send the configuration information of the target RSRP to the first terminal.

Subsequently, the first terminal may activate, based on the physical layer signaling sent by the network device, RSRP calculation or derivation that is performed based on the configuration information of the target RSRP, to obtain a specific value of the target RSRP, and then calculate the corrected path loss based on the specific value of the target RSRP.

Therefore, the first terminal may determine, based on the first parameter in the parameter information and using the preset power control formula, for example, any one of the foregoing formulas (2) to (7), the uplink transmit power used when the uplink transmission is performed on the target beam (or the target beam pair).

In a possible implementation, the foregoing parameter information includes the second parameter, and the second parameter is used to indicate interference caused by the second terminal (the second terminal includes one or more terminals other than the foregoing first terminal) to the first terminal on the target beam (or the target beam pair).

For example, the second parameter may be a value I of interference that is detected by the network device on the target beam or the target beam pair and that is caused by uplink transmission of the second terminal to uplink transmission of the first terminal.

Further, the second parameter may include a second compensation factor $\mu$ of the interference value I, where $0 \le \mu \le 1$.

In this case, if the parameter information includes both the foregoing first parameter (for example, the foregoing G and $\beta$) and the foregoing second parameter (for example, the foregoing I and $\mu$), for the subframe i, the uplink transmit power for performing uplink transmission on the PUSCH may be the following formula (8), that is:

$$P_{PUSCH,c}(i) = \min \left\{ \begin{array}{c} P_{CMAX,c}(i), \\ 10\log_{10}(M_{PUSCH,c}(i)) + P_{O\text{-}PUSCH,c}(j) + \\ \alpha_c(j) \cdot PL_c - \beta + G + \mu \cdot I + \Delta_{TF,c}(i) + f_c(i) \end{array} \right\}$$

In the foregoing formula (8), $\alpha_c(j) \cdot PL_c - \beta \cdot G + \mu \cdot I$ may be used as a new path loss, that is PL'. In other words, when the path loss is calculated using the formula (8), the beam reception gain $G_R$ of the network device and/or the beam sending gain $G_T$ of the first terminal, and the interference caused by the second terminal to the first terminal on the target beam are considered, so that impact caused by the first parameter and the second parameter on the uplink transmit power is excluded in the newly calculated path loss, so as to further improve accuracy of the uplink transmit power.

When the network device receives the uplink data using the target beam and the second terminal sends the uplink data using the omnidirectional beam, the foregoing interference value I may be a value of interference caused by the second terminal received by the network device to the first terminal on the target beam, where the interference includes a beam reception gain $I_R$ of the network device; when the network device receives the uplink data using the target beam, and the second terminal sends the uplink data using the target beam, the foregoing interference value I further includes a beam sending gain $I_T$ generated by the second terminal on the target beam, for example, the foregoing interference value I includes a sum of $I_R$ and $I_T$.

In addition, when the foregoing interference value I is determined, the target beam of the first terminal may detect the estimated value I of the interference caused by the uplink transmission of the second terminal to the uplink transmission of the first terminal. In this case, $I=I_T-X$, where X is a path loss when a signal is transmitted from the first terminal to the network device, and $X \ge 0$.

For example, the first terminal may obtain at least one of the first parameter, the second parameter, and the fourth parameter using the physical layer signaling, that is, dynamically obtain at least one of the first parameter, the second parameter, or the fourth parameter. For example, the first parameter is obtained using TPC (transmit power control, transmit power control) signaling in a PDCCH (physical downlink control channel, physical downlink control channel); or the foregoing first parameter is obtained using signaling used for closed-loop power control.

When the first parameter is delivered using the signaling used for closed-loop power control, the first parameter may be delivered in closed-loop power control together with delta (delta) adjustment or offset (delta) adjustment, or may be delivered together with $\Delta_{TF,c}(i)$ in formulas (1) to (8). This is not limited in this embodiment.

Similar to the foregoing first parameter, a specific value of the second parameter or the fourth parameter may be determined by the first terminal based on at least one of the service type of the to-be-transmitted data, the uplink channel type, the width of the target beam, the number of the subframe, the number of the target beam, the number of the target beam pair, the number of the carrier, and the number of the subcarrier.

Therefore, the first terminal may determine, based on the second parameter in the parameter information and using the preset power control formula, for example, the foregoing formula (8), the uplink transmit power used when the uplink transmission is performed on the target beam (or the target beam pair).

In a possible implementation, the foregoing parameter information includes the third parameter, and the third parameter includes beam-specific target power and/or terminal-specific target power.

The beam-specific target power is a target power value that is set by the network device for the target beam (or the target beam pair); and the terminal-specific target power is a target power value that is set by the network device for the first terminal on the target beam (or the target beam pair).

In the prior art, referring to formula (1), $P_{O\text{-}PUSCH,c}(j)$ is the target power value that is semi-statically set by the network device, where the target power value is generally the cell-specific target power and the terminal-specific target power specified in the 3GPP protocol. Terminal-specific target power in the prior art refers to a target power value that is set by the network device for the terminal.

However, in a millimeter wave application scenario, because a communications medium such as the target beam is introduced, if $P_{O\text{-}PUSCH,c}(j)$ is still determined based on the foregoing method, the determined $P_{O\text{-}PUSCH,c}(j)$ is inaccurate.

Therefore, in this embodiment, the third parameter is introduced when $P_{O\text{-}PUSCH,c}(j)$ is calculated, where the third parameter includes the beam-specific target power and/or the terminal-specific target power. Certainly, the third parameter may further include the cell-specific target power. Therefore, the first terminal may determine a value of $P_{O\text{-}PUSCH,c}(j)$ based on at least one of the beam-specific target power, the terminal-specific target power, and the cell-specific target power, and further calculate the uplink transmit power using any one of the foregoing formulas (2) to (8), so as to improve accuracy of the uplink transmit power.

The value, $P_{O\text{-}PUSCH,c}(j)$ may be a sum of the beam-specific target power and the terminal-specific target power, or may be a sum of the beam-specific target power, the terminal-specific target power, and the cell-specific target power, or may be a sum of the terminal-specific target power and the cell-specific target power.

The beam-specific target power and the terminal-specific target power may be determined based on the detection of the foregoing first target reference signal and the path loss derived from the detection process. The first target reference signal may be triggered by the first terminal or triggered by the network device. The beam-specific target power may be target power specific to one beam or a group of beams.

The cell-specific target power is determined based on the detection of the second target reference signal and the path loss derived from the detection process. The second target reference signal may be specific to the sector beam or the wide beam. This is not limited in this embodiment.

Further, the foregoing beam-specific target power may be determined by the first terminal based on at least one of the service type of the to-be-transmitted data, the uplink channel type, the width of the target beam, the number of the subframe, the number of the target beam, the number of the carrier, and the number of the subcarrier.

In a possible implementation, any one of the foregoing target power may further include a beam gain. For example, the beam-specific target power may include the received beam gain of the network device and/or the beam sending gain of the network device; the terminal-specific target power may include the received beam gain of the terminal and/or the beam sending gain of the terminal.

The beam-specific target power and/or the terminal-specific target power may be dynamically indicated using the physical layer signaling; that is, different from the semi-statically configured target power in the existing system, the beam-specific target power and/or the terminal-specific target power are dynamically notified using the PDCCH.

For any specific parameter value of the beam (or the beam pair), on the beam (or the beam pair), the first terminal uses an uplink power control parameter (that is, the foregoing parameter information) corresponding to the beam (or the beam pair) to determine the uplink transmit power.

The first terminal may perform corresponding uplink power control by applying the corresponding uplink power control parameter to the corresponding value that is specific to the service type of the to-be-transmitted data, and/or specific to the uplink channel type, and/or specific to the width of the target beam, and/or specific to the target beam, and/or specific to the subframe, and/or specific to the target beam pair, and/or specific to the carrier, and/or specific to the subcarrier. In this embodiment, one or a combination of more than one of the foregoing configurations may be referred to as a set-specific configuration.

For example, the first terminal obtains, using the RRC signaling sent by the network device, that a set of the beam-specific target power in different subframes is (−2, 3, 5). That is, a beam-specific target power corresponding to a subframe of type 1 is −2, a beam-specific target power corresponding to a subframe of type 2 is 3, and a beam-specific target power corresponding to a subframe of type 3 is 5. In this case, the first terminal may determine a specific value of the beam-specific target power based on a type of a current subframe i.

For another example, the beam-specific target power is indicated by the RRC signaling as (−8, −4, −2, 3, 5, 6, 7); that is, the beam-specific target power corresponding to each of the beam 1 to the beam 7, and the first terminal performs PUSCH uplink transmission on the beam 3. Therefore, the first terminal may determine that the beam-specific target power corresponding to the beam 3 is 2, and then calculate the uplink transmit power using the foregoing formulas (2) to (8).

In addition, each set may be configured based on any one of subframes, frequency bands, subbands, and beams (or beam pairs) that are of different types. For example, a frequency band a, a subband b, a subframe c, and beams (or beam pairs) 0, 1, 5, and 6 are configured as set 1, and a frequency band a+1, a subband b+1, a subframe c+1, and beams (or beam pairs) 2, 3, 4, 7, 8, and 9 are configured as a set 2.

Then, if the RRC signaling indicates that the beam-specific target power corresponding to the set 1 is −8, and the beam-specific target power corresponding to the set 2 is 6, for example, the RRC signaling indicates that the beam-specific target power is (−8, 6), in this case, if uplink transmission of the PUSCH needs to be performed on a resource corresponding to the set 2, the first terminal may use 6 as the beam-specific target power, and then calculate the uplink transmit power using the foregoing formulas (2) to (8).

Further, the network device may add the foregoing first parameter to the third parameter and send the third parameter to the first terminal. For example, the network device may use a difference between $P_{O\text{-}PUSCH,c}(j)$ and the first parameter (for example, β*G) as the third parameter, and deliver the third parameter to the first terminal. In this case, the foregoing formula (3) may be deformed into the following formula (9), that is:

$$P_{PUSCH,c}(i) = \min \begin{Bmatrix} P_{CMAX,c}(i), \\ 10\log_{10}(M_{PUSCH,c}(i)) + \text{a third parameter} + \\ \alpha_c(j) \times PL_c + \Delta_{TF,c}(i) + f_c(i) \end{Bmatrix} \quad (9)$$

In this case, because the first parameter is already hidden in the third parameter, the network device does not need to send the first parameter to the first terminal.

Further, the foregoing parameter information may include a fifth parameter, where the fifth parameter is used to indicate an adjustment value of closed-loop power control for performing the uplink transmission on the target beam (or the target beam pair), that is, $f_c(i)$ in the foregoing formulas (1) to (9).

When the uplink transmit power is calculated for the target beam (or the target beam pair) in an accumulation mode (accumulation mode), $f_c(i)=f_c(y)+\delta_{PUSCH,c}(i-K_{PUSCH})$, and $y>i$, where $\delta_{PUSCH,c}(i-K_{PUSCH})$ is an offset, the offset may be carried in TPC signaling delivered by the network device, $f_c(i)$ is an adjustment value used when power control is performed on a target subframe y, and the target subframe y is a subframe that is of a same type as a current subframe i and that is followed by the current subframe i.

Correspondingly, when performing closed-loop power control adjustment based on the accumulation mode, if one or more options in the frequency band, the subband, the subframe, and the beam (or the beam pair) are all distinguished in advance, for example, the frequency band, the sub-band, the subframe, and the beam are all distinguished, when the first terminal determines $f_c(y)$, a subframe that is of a same type of frequency band, subband, subframe, and beam as the current subframe i and that is followed by the current subframe i should be used as the target subframe y.

For example, a subframe 1, a subframe 2, and a subframe 4 are subframes of a same type. If the current subframe is the subframe 4, a subframe that is of the same type as the current subframe 4 and that is followed by the current subframe 4 is the subframe 2, and in this case, $f_c(4)=f_c(2)+\delta_{PUSCH,c}(i-K_{PUSCH})$.

It should be noted that a value of G or β in the foregoing formulas (2) to (9) may be a negative number, and in this case, G in the foregoing formulas (2) to (9) is −G and β·G is −β·G.

In addition, the power control method provided in this embodiment is applicable to a scenario in which channels are reciprocal; that is, an uplink path loss used in the uplink power control may be estimated by measuring a downlink path loss derived from a value of downlink RSRP or RSRQ.

Therefore, the first terminal may determine, by obtaining the parameter information required for performing the power control, that is, at least one of the first parameter, the second parameter, or the third parameter and using any one power control formula of the foregoing formulas (2) to (9), the uplink transmit power used when the uplink transmission is performed on the target beam (or the target beam pair) in the millimeter wave system, so as to implement more accurate power control.

The foregoing mainly describes the solutions provided in the disclosed embodiments from the perspective of interaction between network elements. It may be understood that to implement the foregoing functions, the terminal and the network device include corresponding hardware structures and/or software modules for performing the functions. A person of ordinary skill in the art should be easily aware that, in combination with the examples described in the embodiments disclosed in this specification, units, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present disclosure.

In the embodiments, the terminal and the like may be divided into function modules based on the foregoing method examples. For example, each function module may be obtained through division for a corresponding function, or two or more functions may be integrated into one processing module. The integrated module may be implemented in a form of hardware, or may be implemented in a form of a software function module. It should be noted that the module division in the disclosed exemplary embodiments is merely logical function division. There may be other manners of division in actual implementation.

Figure 5:
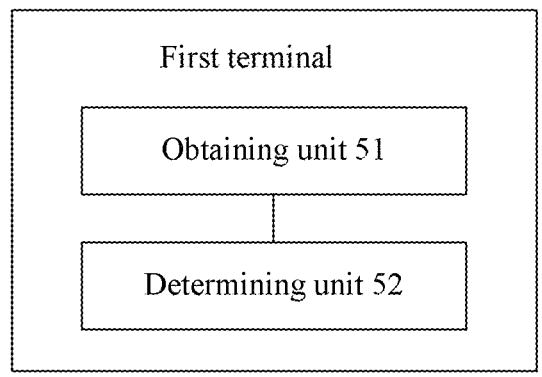
FIG. 5 is schematic structural diagram 2 of a terminal according to an embodiment.

When each function module is obtained through division based on each corresponding function, FIG. 5 is a possible schematic structural diagram of the terminal (for example, a first terminal) used in the foregoing embodiments. The first terminal includes an obtaining unit 51 and a determining unit 52.

The obtaining unit 51 is configured to support the first terminal in performing process 401 in FIG. 4. The determining unit 52 is configured to support the first terminal in performing process 402 in FIG. 4. All related content of steps in the foregoing method embodiments may be cited in function descriptions of corresponding function modules, and details are not described herein again.

Figure 6:
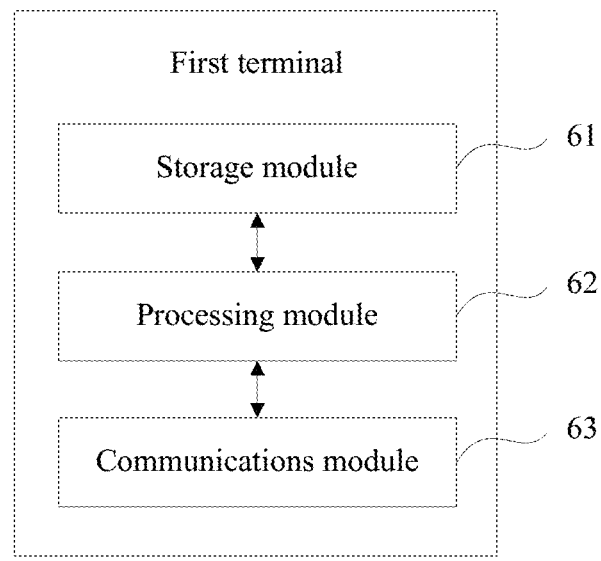
FIG. 6 is schematic structural diagram 3 of a terminal according to an embodiment.

When an integrated unit is used, FIG. 6 is a possible schematic structural diagram of a first terminal used in the foregoing embodiments. The first terminal includes: a processing module 62 and a communications module 63. The processing module 62 is configured to control and manage an action of the first terminal. For example, the processing module 62 is configured to support the first terminal in performing processes 401 and 402 in FIG. 4, and/or is configured to perform another process of the technology described in this specification. The communications module 63 is configured to support communication between the first terminal and another network entity (for example, a network device or a second terminal). The first terminal may further include a storage module 61, configured to store program code and data of the first terminal.

The processing module 62 may be a processor or a controller, such as a central processing unit (Central Processing Unit, CPU), a general purpose processor, a digital signal processor (Digital Signal Processing, DSP), an application-specific integrated circuit (Application Specific Integrated Circuit, ASIC), a field programmable gate array (Field-Programmable Gate Array, FPGA), or another programmable logical device, a transistor logical device, a hardware component, or a combination thereof. The controller/processor may implement or execute various example logical blocks, modules, and circuits described with reference to content disclosed. Alternatively, the processor may be a combination of processors implementing a computing function, for example, a combination of one or more micro-processors, or a combination of the DSP and a microprocessor. The communications module 63 may be a transceiver, a transceiver circuit (for example, an RF circuit), a communications interface, or the like. The storage module 61 may be a memory.

When the processing module 62 is a processor, the communications module 63 is an RF transceiver circuit, and the storage module 61 is a memory, the terminal in this embodiment may be the terminal shown in FIG. 2.

Further, an embodiment provides a computer program, and the computer program includes an instruction. When the computer program is executed by a computer, the computer can perform the data transmission method in the processes 401 and 402.

Further, an embodiment provides a computer storage medium, configured to store a computer software instruction used by the first terminal, where the computer software instruction includes any program designed for execution by the first terminal.

The foregoing descriptions of implementations allow a person skilled in the art to understand that, for the purpose of convenient and brief description, division of the foregoing function modules is used as an example for illustration. In actual application, the foregoing functions can be allocated to different modules and implemented according to a requirement, that is, an inner structure of an apparatus is divided into different function modules to implement all or some of the functions described above. For a detailed working process of the foregoing system, apparatus, and components thereof, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the module division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The apparatus described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

The invention claimed is:

1. A method, comprising:
obtaining configuration signaling indicating which type of target reference signal is used for calculating a path loss, wherein the type of the target reference signal indicates whether a terminal-specific reference signal is used for calculating the path loss or a synchronization signal is used for calculating the path loss;
calculating, based on the target reference signal of the type indicated by the configuration signaling, the path loss of a target beam by:
calculating the path loss using the terminal-specific reference signal when the configuration signaling indicates the terminal-specific reference signal; and
calculating the path loss using the synchronization signal when the configuration signaling indicates the synchronization signal; and
calculating, based on the path loss, an uplink transmit power for performing uplink transmission of the target beam.

2. The method of claim 1, further comprising calculating the uplink transmit power using a power control formula.

3. The method of claim 1, wherein calculating the path loss further comprises:
calculating, based on the target reference signal and according to the configuration signaling, a received signal strength; and
calculating, based on the received signal strength, the path loss.

4. The method of claim 3, wherein calculating the path loss further comprises calculating, based on calculating the received signal strength, the path loss.

5. The method of claim 3, wherein calculating the path loss further comprises calculating, based on filtering the received signal strength using layer-1 filtering, layer-2 filtering, or layer-3 filtering, the path loss.

6. The method of claim 1, further comprising obtaining parameter information required for power control, wherein the parameter information comprises a cell-specific target power, and wherein the uplink transmit power is further calculated based on the parameter information.

7. The method of claim 6, wherein the parameter information further comprises a terminal-specific target power.

8. The method of claim 1, wherein the uplink transmission comprises at least one of transmission on a physical uplink shared channel (PUSCH), transmission on a physical uplink control channel (PUCCH), transmission on a physical random access channel (PRACH), or transmission of a sounding reference signal (SRS).

9. The method of claim 1, wherein the target reference signal comprises a periodic reference signal.

10. The method of claim 1, wherein the target reference signal comprises a cell-specific reference signal.

11. The method of claim 1, wherein the target reference signal corresponds to a sector beam.

12. The method of claim 1, further comprising performing, based on the uplink transmit power, the uplink transmission of the target beam.

13. A method, comprising:
sending, to a terminal, configuration signaling indicating which type of target reference signal is used for calculating a path loss, wherein the type of the target reference signal indicates whether a terminal-specific reference signal is used for calculating the path loss or a synchronization signal is used for calculating the path loss, and wherein the configuration signaling instructs the terminal to calculate, based on the target reference signal of the type indicated by the configuration signaling, the path loss of a target beam by:
   calculating the path loss using the terminal-specific reference signal when the configuration signaling indicates the terminal-specific reference signal; and
   calculating the path loss using the synchronization signal when the configuration signaling indicates the synchronization signal; and
receiving, from the terminal, uplink data transmitted by using uplink transmit power on the target beam,
wherein the uplink transmit power is calculated based on the path loss of the target beam.

14. An apparatus, comprising:
a memory configured to store instructions; and
one or more processors coupled to the memory and configured to execute the instructions to cause the apparatus to:
   obtain configuration signaling indicating which type of target reference signal is used for calculating a path loss, wherein the type of the target reference signal indicates whether a terminal-specific reference signal is used for calculating the path loss or a synchronization signal is used for calculating the path loss;
   calculate, based on the target reference signal of the type indicated by the configuration signaling, the path loss of a target beam by:
      calculating the path loss using the terminal-specific reference signal when the configuration signaling indicates the terminal-specific reference signal; and
      calculating the path loss using the synchronization signal when the configuration signaling indicates the synchronization signal; and
   calculate, based on the path loss, an uplink transmit power used for performing uplink transmission of the target beam.

15. The apparatus of claim 14, wherein the instructions further cause the apparatus to calculate the uplink transmit power using a power control formula.

16. The apparatus of claim 14, wherein the instructions further cause the apparatus to calculate the path loss by:
   calculating, based on the target reference signal and according to the configuration signaling, received signal strength; and
   calculating, based on the received signal strength, the path loss.

17. The apparatus of claim 16, wherein the instructions further cause the apparatus to calculate the path loss by further calculating, based on calculating the received signal strength or filtering the received signal strength, the path loss.

18. The apparatus of claim 14, wherein the one or more processors are further configured to perform, based on the uplink transmit power, the uplink transmission of the target beam.

19. An apparatus, comprising:
a memory configured to store instructions; and
one or more processors coupled to the memory and configured to execute the instructions to cause the apparatus to:
   send, to a terminal, configuration signaling indicating which type of target reference signal is used for calculating a path loss, wherein the type of the target reference signal indicates whether a terminal-specific reference signal is used for calculating the path loss or a synchronization signal is used for calculating the path loss, and wherein the configuration signaling instructs the terminal to calculate, based on the target reference signal of the type indicated by the configuration signaling, the path loss of a target beam by:
      calculating the path loss using the terminal-specific reference signal when the configuration signaling indicates the terminal-specific reference signal; and
      calculating the path loss using the synchronization signal when the configuration signaling indicates the synchronization signal; and
   receive, from the terminal, uplink data transmitted by using uplink transmit power on the target beam,
   wherein the uplink transmit power is calculated based on the path loss of the target beam.

20. The apparatus of claim 19, wherein the apparatus is a base station.

21. The apparatus of claim 19, wherein the terminal-specific reference signal comprises a received beam gain of the terminal or a beam sending gain of the terminal.

* * * * *

UNITED STATES PATENT AND TRADEMARK OFFICE
CERTIFICATE OF CORRECTION

| | |
|---|---|
| PATENT NO. | : 11,924,775 B2 |
| APPLICATION NO. | : 17/556442 |
| DATED | : March 5, 2024 |
| INVENTOR(S) | : Lili Zhang et al. |

It is certified that error appears in the above-identified patent and that said Letters Patent is hereby corrected as shown below:

On the Title Page

Page 2, FOREIGN PATENT DOCUMENTS:
KR 20120080327 R 7/2012
Should read:
KR 20120080327 A 7/2012

Signed and Sealed this
Thirtieth Day of April, 2024

Katherine Kelly Vidal
*Director of the United States Patent and Trademark Office*